(12) United States Patent
Regalado et al.

(10) Patent No.: US 8,443,815 B2
(45) Date of Patent: *May 21, 2013

(54) FLEXIBLE LEVEL SYSTEM FOR A COMB

(75) Inventors: Jose Joaquin Regalado, San Clemente, CA (US); Fedrico Hormozi, Aliso Viejo, CA (US)

(73) Assignee: HSE Partners, LLC, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,193

(22) Filed: Sep. 23, 2010

(65) Prior Publication Data
US 2011/0067724 A1  Mar. 24, 2011

Related U.S. Application Data

(63) Continuation-in-part of application No. 12/565,456, filed on Sep. 23, 2009.

(60) Provisional application No. 61/099,466, filed on Sep. 23, 2008, provisional application No. 61/310,804, filed on Mar. 5, 2010.

(51) Int. Cl.
*A45D 24/10* (2006.01)
*A45D 24/34* (2006.01)

(52) U.S. Cl.
USPC .......................................... 132/148; 132/213

(58) Field of Classification Search
USPC ......... 132/213.1, 213, 214, 148, 218; 33/334, 33/347
See application file for complete search history.

(56) References Cited

U.S. PATENT DOCUMENTS

| 283,057 | A | | 8/1883 | Aldbich | |
|---|---|---|---|---|---|
| 405,227 | A | | 6/1889 | Sciiaubel | |
| 428,529 | A | | 5/1890 | Schofield | |
| 428,669 | A | | 5/1890 | Dummer | |
| 1,239,951 | A | | 9/1917 | Peckham | |
| 2,879,777 | A | | 3/1959 | Miller | |
| 3,134,382 | A | * | 5/1964 | Broman | 132/213.1 |
| 3,664,032 | A | * | 5/1972 | Tompkins | 33/334 |
| 3,820,249 | A | | 6/1974 | Stone | |
| 3,832,782 | A | | 9/1974 | Johnson et al. | |
| 4,295,279 | A | | 10/1981 | Sienknecht | |
| 4,368,745 | A | | 1/1983 | McGuffey | |
| 4,457,078 | A | * | 7/1984 | Suchy | 33/334 |
| 4,517,998 | A | | 5/1985 | Furco | |
| 4,785,544 | A | * | 11/1988 | Heinsius et al. | 33/334 |
| 4,830,031 | A | | 5/1989 | Quinones et al. | |
| 4,905,717 | A | | 3/1990 | Taylor | |
| 5,063,679 | A | * | 11/1991 | Schwandt | 33/347 |
| 5,456,273 | A | | 10/1995 | Tungpagasit | |
| 6,463,666 | B1 | * | 10/2002 | Szumer | 33/484 |

(Continued)

FOREIGN PATENT DOCUMENTS

EP  138805 A1  5/1985
FR  2654209 A1  5/1991

*Primary Examiner* — Robyn Doan
(74) *Attorney, Agent, or Firm* — PatentBest; Andrew McAleavey

(57) ABSTRACT

A comb system for creating or replicating a haircut. The comb system has a comb with level attachments and measuring devices that measure different angles of the comb with respect to an object, such as a head. The level attachments and measuring devices are removable and adjustable, allowing for flexibility and customization. In one embodiment, the comb system can measure the comb's roll, pitch, and yaw angles for any given orientation of the comb.

20 Claims, 8 Drawing Sheets

U.S. PATENT DOCUMENTS

| | | |
|---|---|---|
| 6,785,977 B1 | 9/2004 | Cricthon |
| 2005/0011531 A1 | 1/2005 | Gers |
| 2007/0023063 A1 | 2/2007 | Deuel |
| 2007/0256699 A1 | 11/2007 | Veras |
| 2008/0060666 A1 | 3/2008 | Bandonis |
| 2008/0060667 A1 | 3/2008 | Bandonis |
| 2008/0078418 A1* | 4/2008 | Ghoorchian ............... 132/213.1 |
| 2009/0217937 A1 | 9/2009 | Nelson |

* cited by examiner

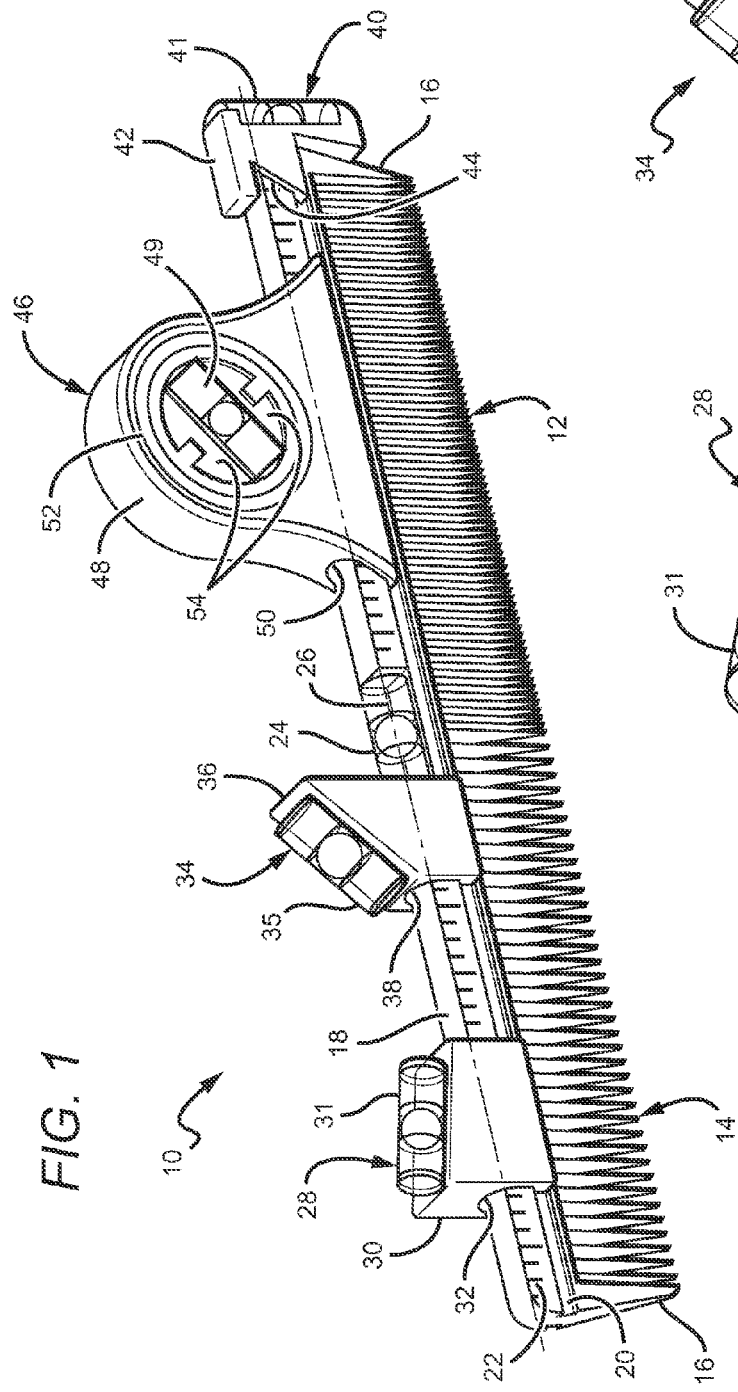

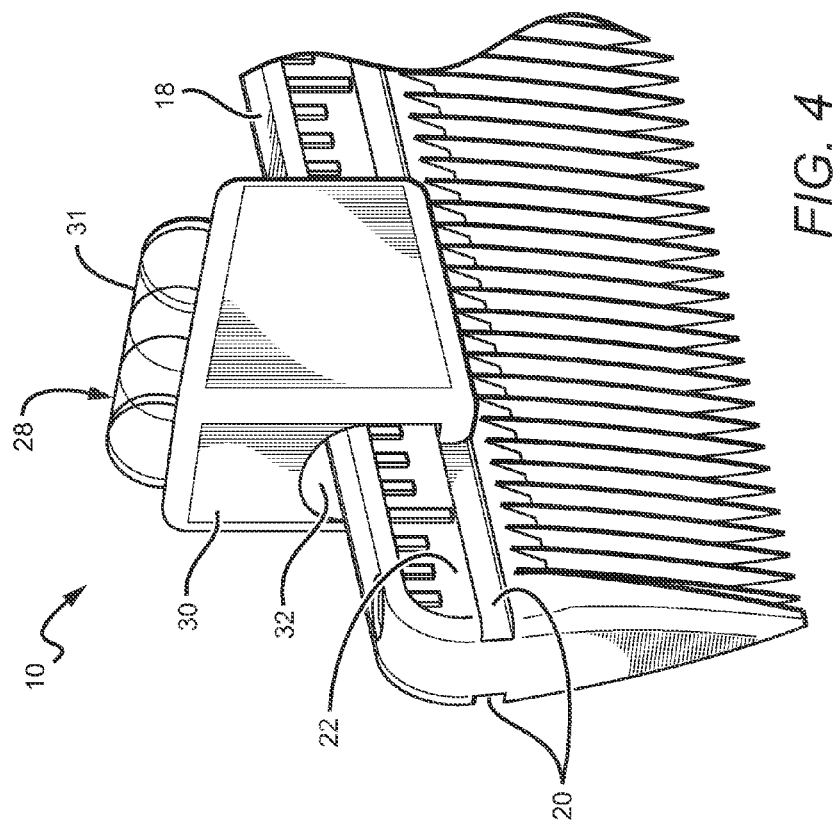
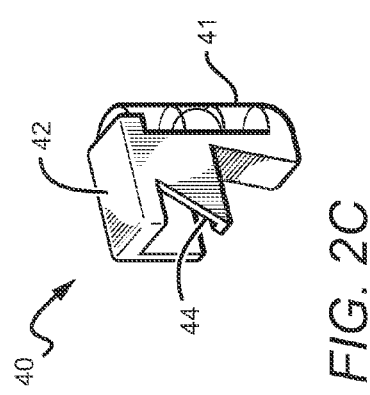
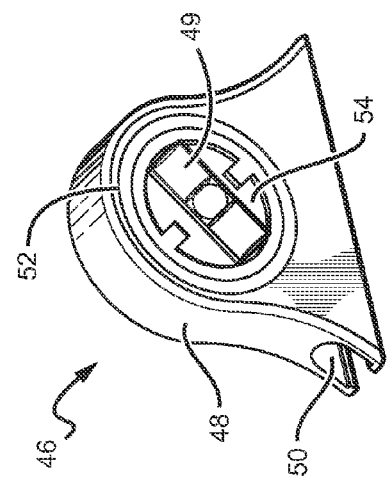

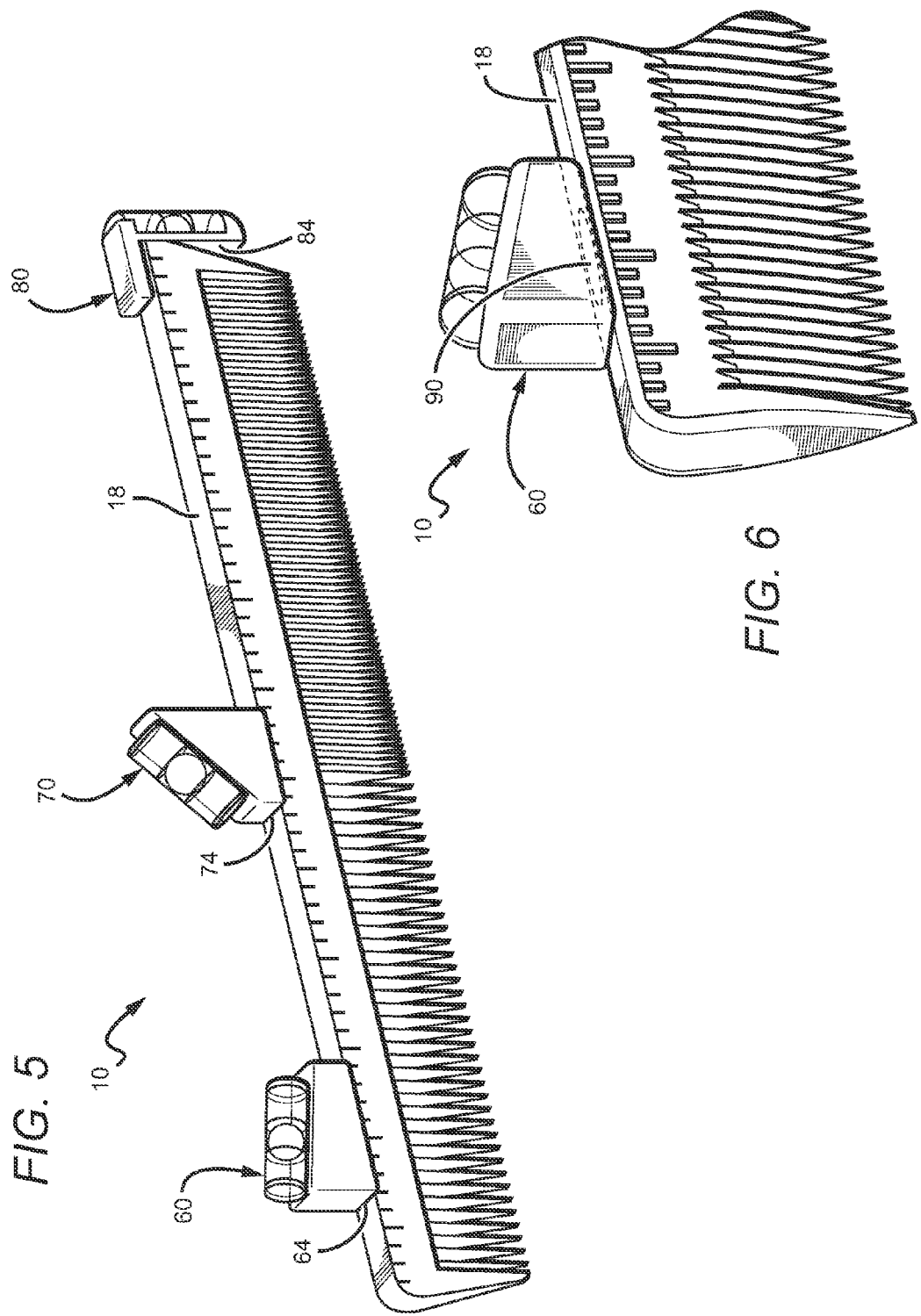

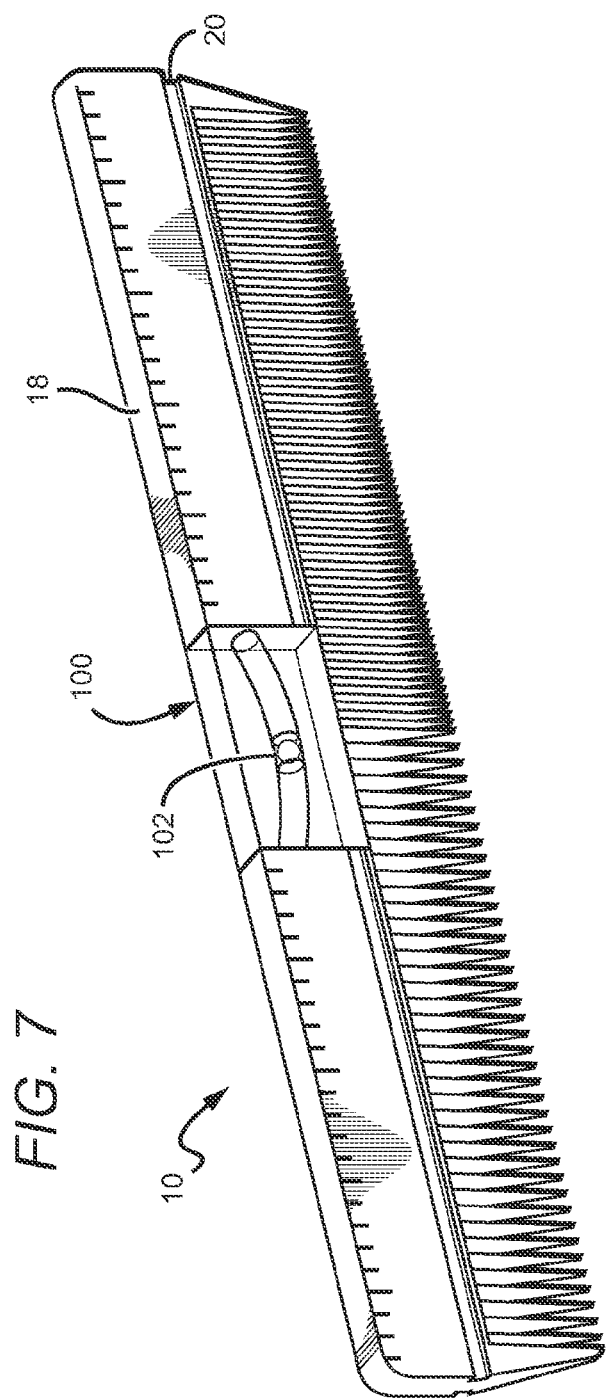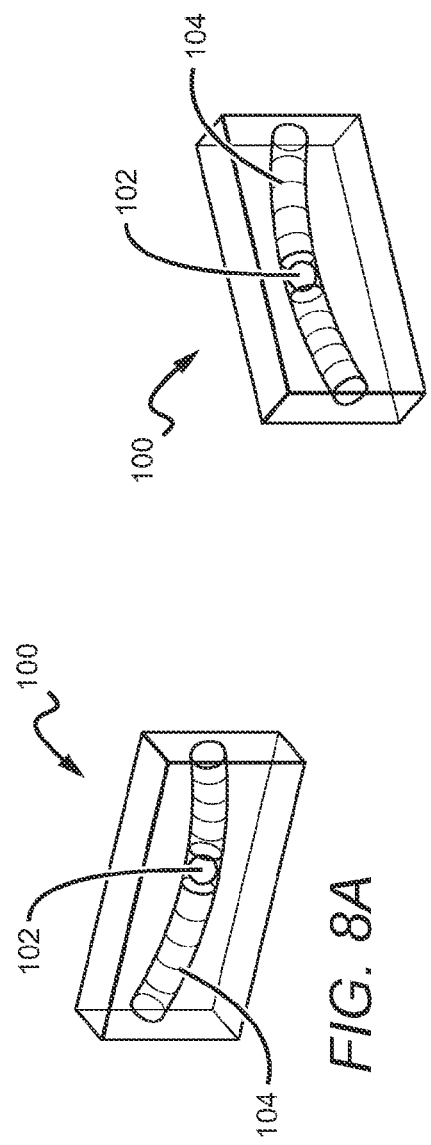

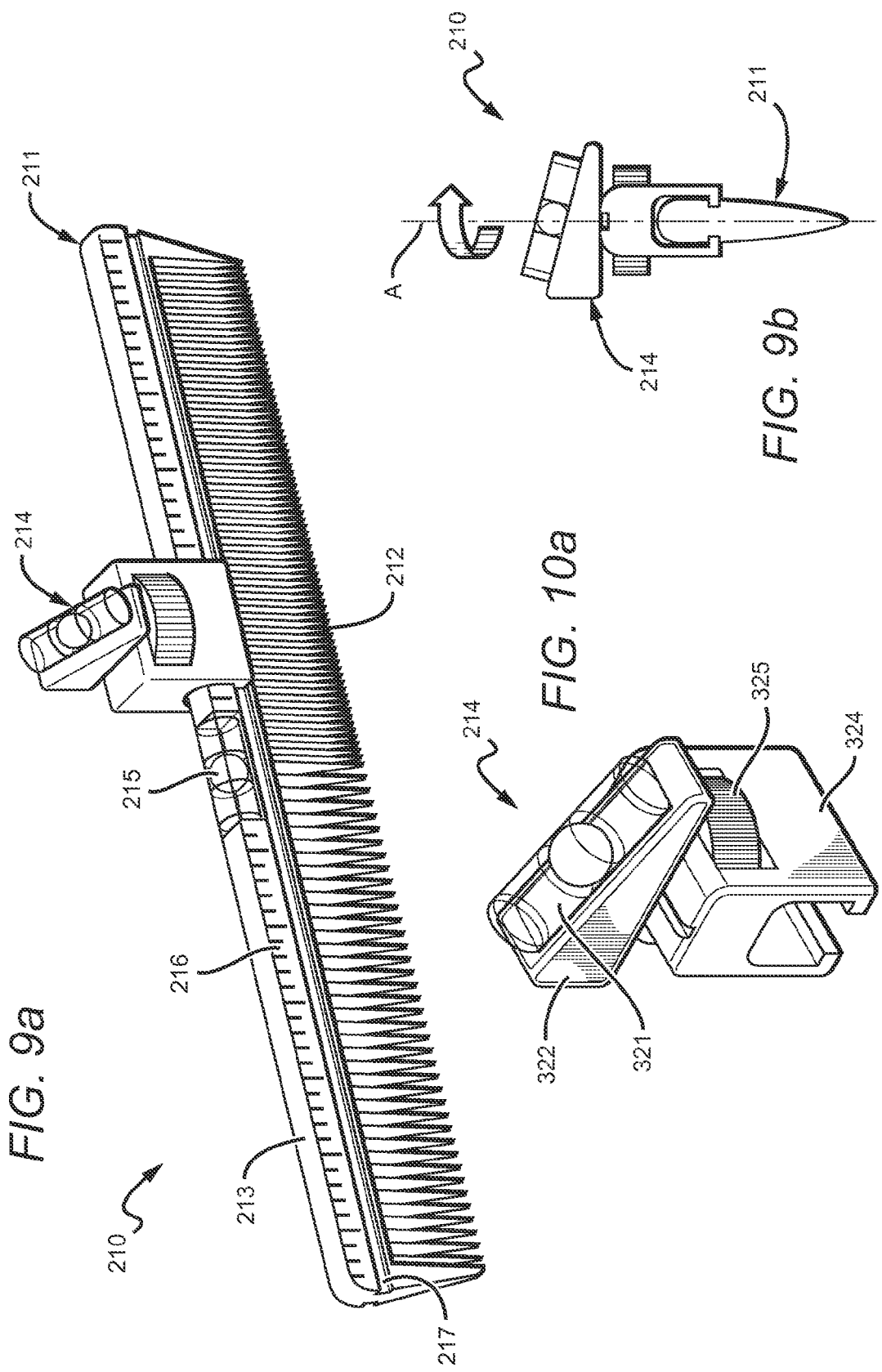

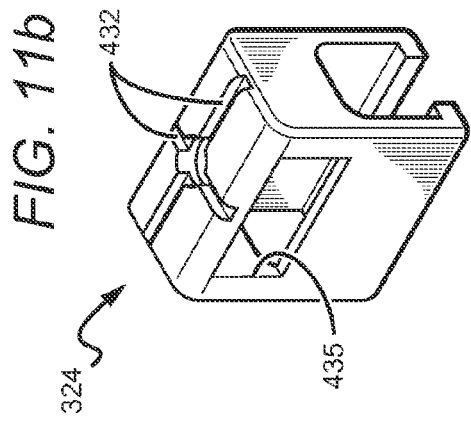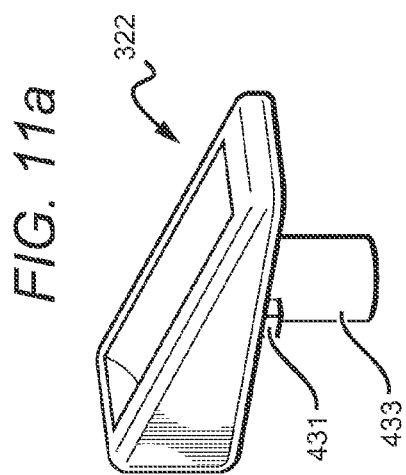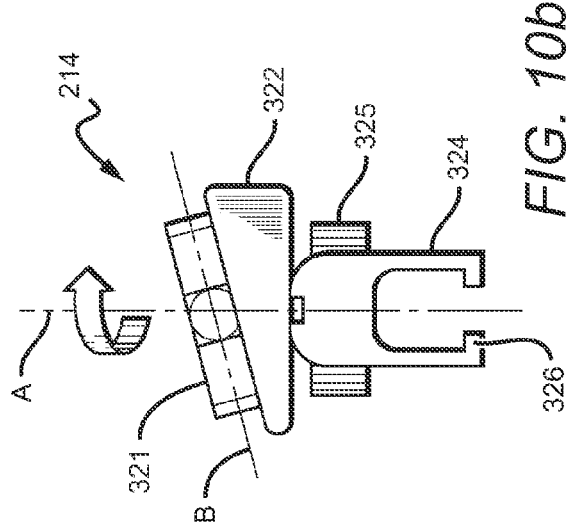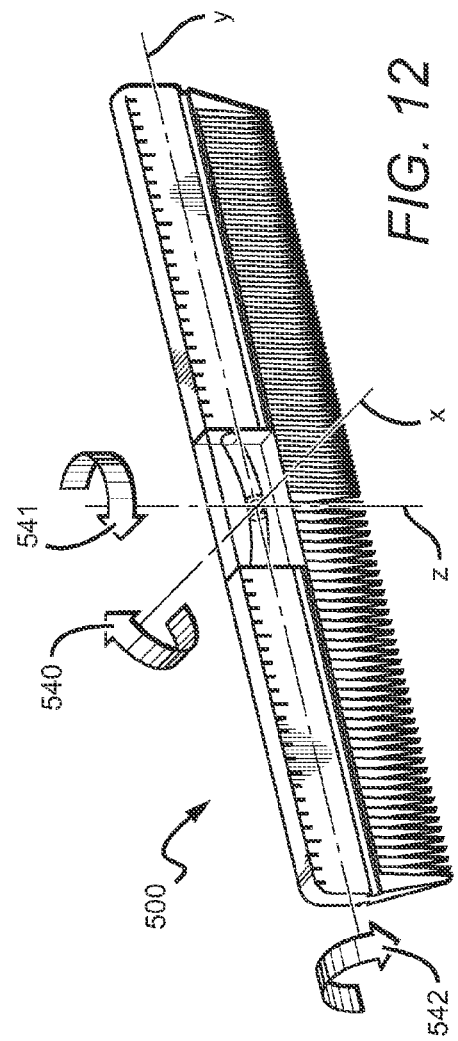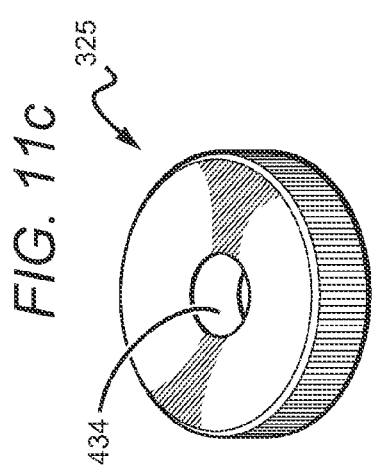

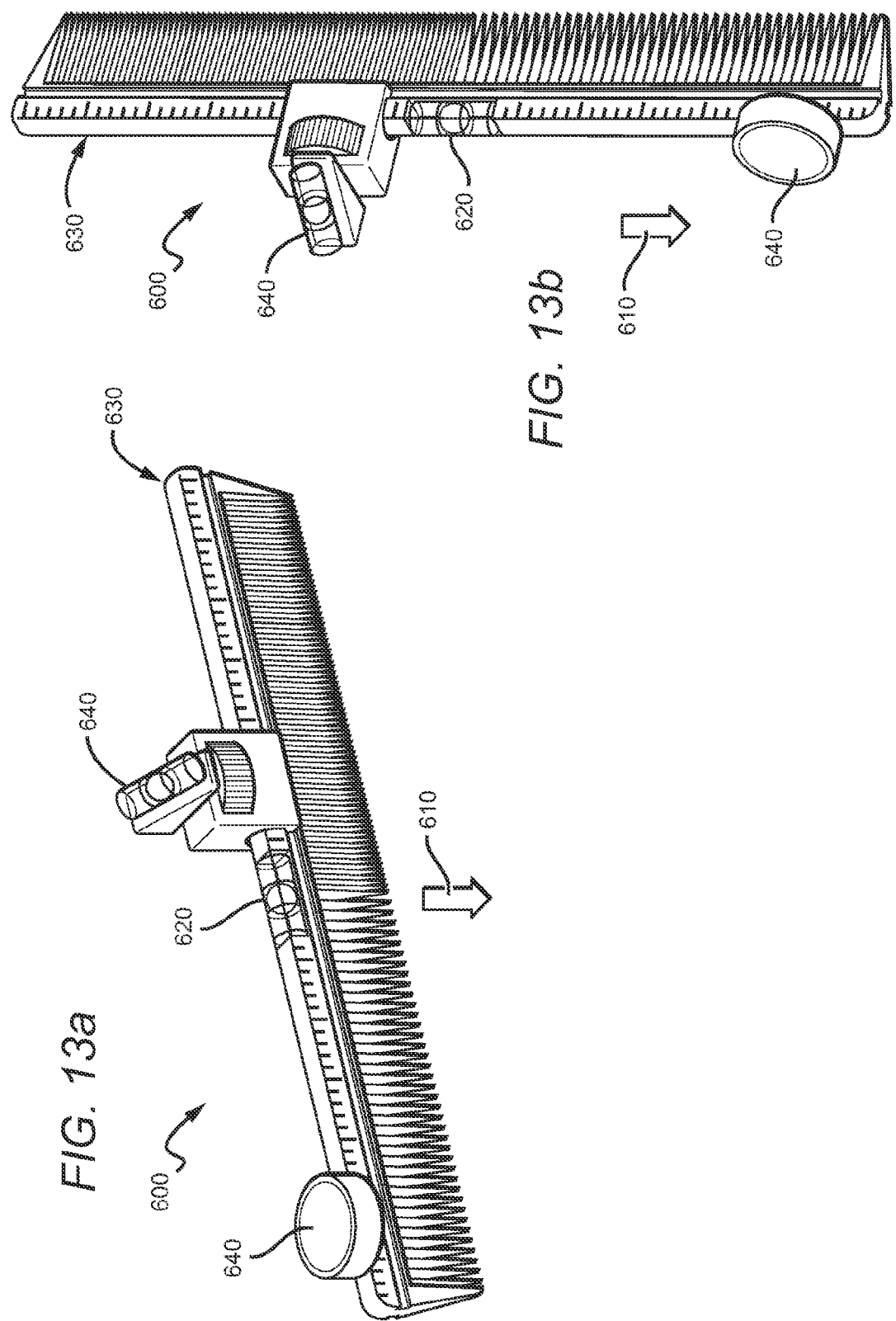

FLEXIBLE LEVEL SYSTEM FOR A COMB

This application is a continuation-in-part of U.S. patent application Ser. No. 12/565,456 filed Sep. 23, 2009 which claims priority to U.S. Provisional Application 61/099,466 filed on Sep. 23, 2008. This application also claims priority to U.S. Provisional Application 61/310804 filed on Mar. 5, 2010. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention relates to removable and adjustable level systems for use with a comb for aiding in the cutting of hair at specific angles.

BACKGROUND

Everyone needs a haircut yet this seemingly simple act is quite complicated. Not only is everyone's hair texture, head shape, hair direction and hair style preference different, but the common tools available to today's hair stylists are quite limiting. Combs, razors, and scissors are the staples of a hairstylist's arsenal and yet they have remained the same for decades, if not for centuries. A brilliant cut can involve angles that are difficult to replicate, making the goal of a "perfect haircut" very laborious and time consuming. Thus, brilliant haircuts are limited to those who have practiced for years, those who have an innate sense of how it works, and simply to luck of the draw.

Numerous comb designs teach a level or a measuring device permanently attached to or integrated within the structure of the comb. See U.S. Pat. No. 2,879,777 to Miller et al.; U.S. Des. No. 428,529 to Lucero; U.S. Des. No. 428,669 to Lucero; U.S. Des. No. 406,391 to Lucero; U.S. Des. No. 405,228 to Lucero; U.S. 405,227 to Lucero; U.S. Des. No. 283,057 to Rogers U.S. Pat. No. 4,368,745 to McGuffey. However, these levels are neither removable nor adjustable, meaning they are limited to measuring one particular angle.

Improvements have been made to combs to measure more than one angle. U.S. Pat. No. 4,517,998 to Furco and U.S. Publ. No. 2008/0078418 to Ghoorchian both teach using more than one level on one comb in order to provide measurement of different angles. However, each individual level is permanently affixed to the comb and can only measure one angle. Since a person's head is a three dimensional object, it is desirous to have a comb capable of measuring a comb's change of position in all three dimensions (pitch, yaw, and roll; see FIG. 12). Furthermore, it is desirous to have a level that is adjustable, allowing for measurement of more than one angle.

Others have taken the three dimensional aspect of a head into consideration. U.S. Publ. No. 2007/0023063 to Deuel, for example, teaches a comb having a ball level. While the ball level provides for measuring of angles in more than one direction, it is hard to manipulate the ball level and does not provide accurate and consistent readings. U.S. Publ. No. 2005/0011531 to Gers and U.S. Publ. No. 2008/0060666 to Bandonis teach placing a level perpendicular to the comb's length, allowing for measurement of the roll angle (see FIG. 12) when the comb is held horizontally. Bandonis also teaches using a rotatable (i.e. adjustable) level and placing multiple levels on one comb. While Bandonis provides a system for measuring a comb's change of position in different dimensional directions (pitch, yaw, and roll), the levels are not removable and thus lack user customization. Further, Bandonis fails to provide measurement of all three dimensional directions for any given orientation of the comb.

Thus, there still exists a need for a comb system in which different angles can be measured quickly and easily to facilitate a specific angled haircut. There also exists a need for a removable and adjustable apparatus which can be attached to a comb and adjusted to measure different angles. Finally, there still exists a need for a comb system capable of measuring all three dimensional directions for any given orientation of the comb with respect to a person's head.

This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

SUMMARY OF THE INVENTION

The inventive subject matter provides apparatus and systems that include a comb with a toothed portion, a handle portion and a number of removable and adjustable level attachments placed along the toothed portion.

The level attachments preferably are situated in a level housing that contains a measuring device for measuring various angles, such as a cylindrical bubble level, accelerometer, or gyroscope. Furthermore, the level attachments preferably have a protrusion for engaging a grove of the comb, but can be attached via other means such as with magnets or an adhesive attached to the bottom of the level attachments. It is also contemplated that the level attachments can be coupled to a separate adapter for attaching the level attachment to a comb without grooves. It is further contemplated that the level attachment can be used on its own, without a comb or other instruments.

The bubble level may be configured in various orientations for measuring the comb's pitch, roll, and yaw. Preferably, the orientation of the bubble level with respect to the comb can be adjusted. The level attachment can also include a dial for adjusting the bubble level by rotating it with respect to the comb. Preferably, the dial can rotate the level about an axis parallel to the length of a tooth of the comb. Preferably, the dial can be adjusted to any angle ranging from 0° to 360°. However, the dial may also be configured to toggle between a limited number of angles, such as 15°, 45°, and 90°. Preferable, the level attachments can be moved along the length of the comb, allowing for greater customization of placement of the level attachments.

It is also contemplated that an adjustable level attachment can be used to the measure angles of a desired orientation of the comb with respect to a person's head. Once the angle of a desired orientation has been determined, then a corresponding non-adjustable level attachment can be selected and used on the comb. Further, a scale for measuring the length of hair can be coupled to the comb.

Yet preferably, there exists a kit that contains a comb, a set of rotatable and adjustable level attachments for measuring various angles, and an instruction booklet as to how to use the comb and level attachments for cutting hair.

It is also contemplated the removable level attachments can be use with many various devices, such as rulers and existing levels for additional angle measurements. It is preferred that the removable level attachments for a device has an adjustable and removable level housing. It is also preferred that different types of levels are disposed within the removable level housing, and an attachment mechanism to couple the removable level housing to a side of the device. Furthermore, it is contemplated that the removable level attachment can be attached not only to a side of the device, but within the device so as to be interchange with existing built-in levels.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a perspective view of a comb system implementing the present inventive subject matter.

FIGS. 2A, 2B, 2C are close-up views of various level attachments embodying the present inventive subject matter.

FIG. 3 is a close-up view of an adjustable level attachment.

FIG. 4 is a close-up view of FIG. 1.

FIG. 5 is a perspective view of another preferred implementation of a comb system embodying the present inventive subject matter.

FIG. 6 is a close-up view of FIG. 5.

FIG. 7 is a perspective view of yet another preferred implementation of a comb system embodying the present inventive subject matter.

FIGS. 8A and 8B are close-up views of a measuring level.

FIG. 9a is a perspective view of a comb system implementing another embodiment of the present inventive subject matter.

FIG. 9b is a side view of the comb system shown in FIG. 9a and shows an axis A.

FIG. 10a is a perspective view of a level attachment implementing the present inventive subject matter.

FIG. 10b is a side view of FIG. 10a and shows an axis A.

FIGS. 11a-11c are perspective views of a level housing, platform, and dial, respectively, of the level attachment shown in FIG. 10a.

FIG. 12 is a perspective view of a comb system shown with respect to a datum of axes and changes in angles with respect to the datum axes.

FIG. 13a and b are perspective views of another embodiment of the present inventive subject matter.

DETAILED DESCRIPTION

Figure 14:
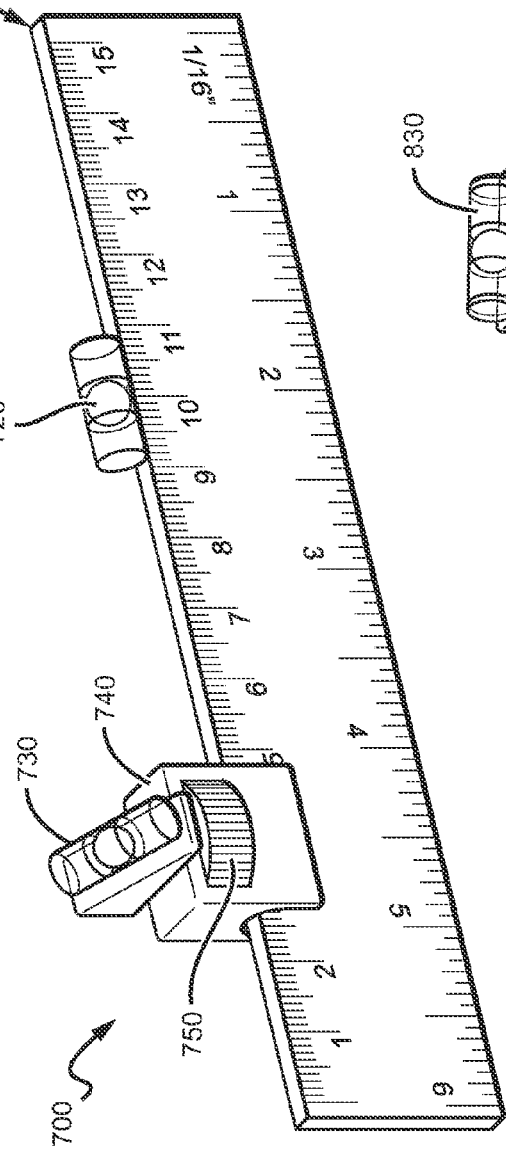
FIG. 14 is a perspective view of yet another embodiment of the present inventive subject matter.

As illustrated in the attached Figures, a comb system is provided to guide a person to accurately cut hair or teach cutting hair at varying angles. As illustrated in FIG. 1, in one implementation, a comb system is provided that includes five levels for determining when the comb is positioned at various angles.

In FIG. 1, comb system 10 generally includes a portion of fine teeth 12 and a portion of wide teeth 14 and back portion 18. Also along the back portion of the comb is a scale 22 for indicating the length of hair that needs to be cut. Along the scale, a fixed level 24 is affixed as part of the comb. Level 24 allows for measurement of the comb's pitch. The fixed levels may be of different angles and can be incorporated along the back portion of the comb or within the handle of the comb. Those skilled in the art will recognize that the fixed level can be a bubble level which includes horizontal and vertical angles ranging from 0° to 180° relative to central axis 26 of comb. Alternatively, the fixed level could comprise an accelerometer or gyroscope.

Preferably, the comb is made out of a semi-rigid moldable material such as plastic, glass reinforced resin, ABS, and polystyrene. The teeth are the same shape, size and form as commonly found on standard combs, which preferably includes a comb with two different sized teeth. The comb preferably has a back portion section. However it is contemplated that the comb can have a handle portion as found on standard combs.

Extending from the end teeth 16 of the comb and fixed along the back portion is a groove 20 that can be coupled with various level attachments 28, 34, 40, and 46. Each attachment can be of a varying angle with respect to central axis 26. First level attachment 28, which is shown in detail in FIG. 2A, includes a cylindrical bubble level 31. The length of level 31 makes a 15° angle with central axis 26. The cylindrical bubble level 31 is placed in first level housing 30, which is coupled to the groove of the comb via the first level attachment engaging portion 32.

Second level attachment 34 which is shown in detail in FIG. 2B, includes a cylindrical bubble level 35 that provides 45° angle from the central axis. The cylindrical bubble level 35 is placed in second level housing 36, which is coupled to the groove of the comb via the second level attachment engaging portion 38.

Third level attachment 40 which is shown in detail in FIG. 2C, includes a cylindrical bubble level 41 that provides 90° angle or is perpendicular from the central axis. The cylindrical bubble level 41 is placed in third level housing 42, which is coupled to the groove and the end tooth of the comb via the third level attachment engaging portion 44.

For flexibility, as shown in detail in FIG. 3, and also seen in FIG.1, an adjustable level attachment 46 includes a cylindrical bubble level 49 that sits inside an adjustable housing 48 and abuts a dial 52 that is placed in a recess 54 so the cylindrical bubble level 49 can be adjusted to any desired angle. The cylindrical bubble and the dial are placed in adjustable level housing 48, which is coupled to the groove of the comb via the adjustable level attachment engaging portion 50. Adjustable level attachment 46 can be used to measure angles of a desired orientation of the comb with respect to a person's head. Preferably the adjustable level attachment can be removed on and off the comb via a coupling mechanism. However, it is contemplated that the adjustable level attachment can be permanently affixed to the comb.

The cylindrical bubble levels can be mounted on the level housing or within the comb in a click-lock arrangement as disclosed in U.S. Pat. No. 4,905,717 to Taylor et al., which is incorporated herein, or by other means known to those of ordinary skill in the art.

An advantage of the present inventive subject matter is to provide different angles for use in a flexible manner. The level attachments can be easily taken on and off in combination along the groove of the comb for any desired combination of angles to facilitate cutting of hair. The groove is a recess in which the level engaging portion can easily be coupled with for use and for change of different angles. FIG. 4 shows a close-up view of the level attachment being coupled to the groove of the comb which works as a recess to allow the level engaging portion to slide on and off. Accordingly, level attachments may be sold separately for engagement or interfacing with a particular type of comb.

Despite a current preference for a comb to have a groove, it is also contemplated that embodiments of the inventive subject matter could be practiced on any existing comb, as illustrated in one preferred embodiment in FIG. 5. A comb system 10 has a back portion 18 but does not have any existing groove or recess. The level attachments, 60, 70 and 80 are then placed on the back portion of the comb via other coupling means, such as an adhesive 90 as shown in a close-up view in FIG. 6. Thus, instead of having an engaging portion to couple with the back portion of the comb, the level attachments have an edge shown in 64, 74 and 84 where an adhesive can be applied. Adhesives can comprise glue, magnets, double-sided tape or any other attachment mechanisms that are known to one skilled in the art. Other preferred coupling mechanism includes having a sleeve (not shown) with grooves that can be placed over an existing comb. While it is preferred to use the level attachments with a comb, it is contemplated that an adapter device with a set of level attachments can be used on its own or with other instruments for measuring.

In another preferred embodiment, shown in FIG. 7, a comb system 10 has a concave level 100 placed on the back portion 18. The concave level 100 has a concave cylindrical bubble 102 that can be used to measure a particular angle for cutting hair using the angular graduations 104. For example, when a user wants to cut hair in a particular direction but does not know the angle of such direction, the user can measure the direction using angular graduations 104 to determine the angle of the direction. Once the angle is determined, the user then can find the right level attachments to ensure accuracy in cutting the hair. Preferably, the concave level 100 is fixed within the back portion of the comb. However, it is also contemplated that the concave level 100 can be attached in similar fashions as the adaptable level attachments by engaging a groove of a comb or using an adhesive on existing combs without a groove. It is also contemplated that the concave level can be a convex level relative to the central axis of the comb as shown in FIG. 8B.

Any type of bubble or spirit level device capable of indicating the level of a surface between horizontal, vertical or to the nearest degree, may be utilized in connection with the present inventive subject matter. Preferably, the cylindrical bubble levels are placed in the level housing via an adhesive or another other means as appreciated by one ordinary skilled in the art. An accelerometer can also be used to indicate the level of a comb. In one preferred embodiment, an accelerometer is used in combination with a speaker that produces an audible sound for indicating that the comb has reached a desired angle. In another embodiment, an LED is used to indicate that the comb is being held in a desired angle.

Preferably, comb system 10 also has a level or indicator that does not rely on gravity, such as a compass or gyroscope, allowing for the measurement of angle changes within a plane perpendicular to the force of gravity. In this manner, the comb system can provide for measuring angles in all three dimensional directions (roll, pitch and yaw) for any one orientation of the comb. U.S. Patent Application 2005/0011531 to Gers discloses using a magnetically biased pointer with a comb and is incorporated herein by reference.

In FIG. 9a, comb system 210 generally includes a comb 211 having a toothed portion 212 having a plurality of teeth and a handle portion 213. Attached to comb 211 is a level attachment 214 for measuring various angles. When the comb is held horizontally with teeth facing down, level attachment 214 will measure the comb's roll. When the comb is held in the vertical position, attachment 214 will measure the comb's yaw.

Comb 211 can further include a fixed level 215 and a scale 216 for measuring hair length. Fixed level 215 may be oriented differently than shown in order to measure various angles, and can be integrated within the handle portion 213. Comb 211 also has a groove 217 for facilitating attachment of level attachment 214 to comb 211.

It is contemplated that any type of bubble or spirit level device capable of indicating the level of a surface between horizontal, vertical or to the nearest degree, may be utilized in connection with the present inventive subject matter.

In FIG. 9b, a side view of comb system 210 is shown. Axis A is shown as a vertical line which runs parallel to the length of the teeth of toothed portion 212. FIGS. 10a-10b show level attachment 214 having a platform portion 324 and a level housing 322. Level housing 322 includes a level 321. Preferably, level 321 is placed in the level housing via an adhesive or another other means as appreciated by one ordinary skilled in the art. Level housing 322 is rotatably coupled to platform portion 324 such that it rotates about axis A while platform portion 324 remains still. Dial 325 is coupled to level housing 322 and provides a means for rotating level housing 322. It is also contemplated that dial 325 can indicate angle settings (not shown), such as 0°, 90°, 180° and 270°. FIG. 10b shows platform portion 324 having a protrusion 326 which is capable of engaging groove 217 (see FIG. 9a).

FIG. 10b shows level 321 having an axis B, running parallel to the length of level 321. Level 321 can be oriented relative to axis A such that axis A and B are parallel, orthogonal, or any other configuration. Preferably, level 321 can be adjusted such that its axis B can form any desired angle with respect to axis A, providing greater customization of level attachment 314.

FIGS. 11a-11e show the various components of level attachment 214. Level housing 322 has a rectangular protrusion 431 (FIG. 11a) for mating with groves 432 on platform portion 324 (FIG. 11b). Level housing 322 also has a cylindrical protrusion 433 (FIG. 11a) capable of mating with an opening 434 on dial 325 (FIG. 11e). Platform portion 324 also has an opening 435 (FIG. 11b) in which dial 325 may be disposed. According to FIGS. 11a-11b, platform portion 324 and level housing 322 are sized and dimensioned to couple with one another such that level housing 322 is rotated to predefined angles of 0°, 90°, 180°, 270°. Those skilled in the art will recognize that level housing 322 and platform portion 324 may be sized and dimensioned to couple with one another such that level housing 322 rotates continuously throughout any angle from 0° to 360°.

FIG. 12 shows comb 500 with respect to a datum of axes x, y, and z. Various angle changes are shown for purposes of defining various movements of a comb. Rotation 540 represents a rotation of comb 500 about the x axis. This movement is similar to a plane flying upward or downward and is referred to herein as "pitch." Rotation 541 represents a rotation of comb 500 about the z axis. This movement is similar to a plane steering to the left or right and is referred to herein as "yaw." Rotation 542 represents a rotation of comb 500 about the y axis. This movement is similar to a plane rolling to the left or right and is referred to herein as "roll."

In one preferred embodiment, a comb system is capable of measuring the angle changes of all three dimensional directions (pitch, yaw, and roll) for any given orientation of the comb. FIG. 13a shows a comb system 600 with respect to a field of gravity 610, shown as an arrow. Bubble level 620 is positioned such that it will indicate the pitch of comb 630.

Bubble level 640 is positioned such that it will indicate a roll of comb 630. Since bubble levels rely on a field of gravity to indicate changes in angles, bubble levels are inherently incapable of measuring angle changes that are within a plane perpendicular to the field of gravity (e.g. yaw of comb 630 in FIG. 13*a*). Thus, gyroscope 640 is included in comb system 600 in order to indicate a yaw of comb 630.

When comb system 600 is held in a vertical position (i.e. when the length of comb 630 is parallel to field of gravity 610), as show in FIG. 13*b*, bubble level 640 indicates yaw rather than roll. Thus, whether a bubble level indicates pitch, roll, or yaw (or combinations thereof) will depend on how the bubble level and comb are oriented with respect to a field of gravity. It is consistent with the inventive subject matter herein to provide various orientations of bubble levels with respect to the comb in order to enhance functionality of the comb system.

It is further contemplated that the present inventive subject matter can be applied in other measuring device besides a comb. FIG. 14 shows a ruler system 700 having a ruler 710 and two bubble levels. Ruler 710 can be used for measuring objects or drawing lines. Bubble level 720 allows a user to measure a pitch of ruler 710. Bubble level 730 allows a user to measure a roll of ruler 710. Level 730 is removably attached to ruler 710 via platform 740, allowing level 730 to be placed anywhere along the length of ruler 710 or to be completely removed. Dial 750 allows a user to rotate level 730.

Figure 15:
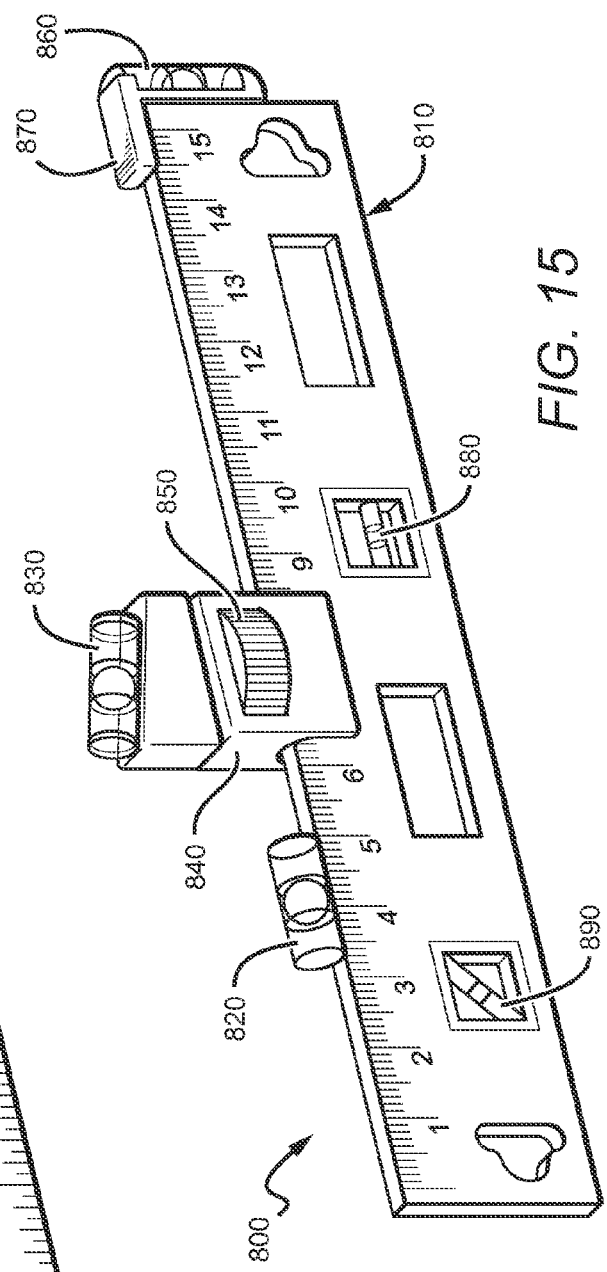
FIG. 15 is a perspective view of yet another embodiment of the present inventive subject matter.

In a preferred embodiment shown in FIG. 15, a level system 800 with an existing level 820 can have various other removable level attachments. Bubble level 820 allows a user to measure a pitch of level system 810. Bubble level 830 allows a user to measure a roll of level system 810. Level 830 is removably attached to level system 810 via platform 840, allowing level 830 to be placed anywhere along the length of level system 810 or to be completely removed. Dial 850 allows a user to rotate level 830. Furthermore, level housings 880 and 890 can be interchanged with different bubble levels for measurement of various angles. Level 860 is a vertical bubble that can be attached to the end of the comb via a clip 870, which houses level 860 and also be attached to the top of the comb.

It is contemplated that a kit can have a comb with a coupling mechanism to receive the various different level attachments. It is also contemplated that a kit can have just level attachments and coupling mechanisms, which can be used with existing combs. Preferably, there exists a kit that contains a comb, at least one level attachment for measuring various angles that can be removably coupled to the comb, and an instruction booklet as to how to use the comb for cutting hair. It is contemplated that the instruction booklet could provide information in multiple formats, such as text, audio, and/or visual. In one preferred embodiment the instruction booklet provides a legend for identifying the preset angles of level attachments based on their color. The level attachment is preferably a cylindrical bubble level with a length oriented perpendicular to an axis parallel to the length of a tooth of the comb, and can rotate about the axis, thereby providing measurement of the comb's roll when the comb is oriented horizontally.

The advantages of this system are numerous and enormous. Users not only have a selection of angles to choose from to facilitate or to teach how to cut hair, but the implementation of the level attachment to the comb is simple and effective. Users do not have to worry about the inconvenience of hard to read instructions or cumbersome tools. The comb system further allows for measuring the pitch, roll, and yaw of the comb for any given orientation of the comb. Finally, the adjustable and removable levels provide for higher customization and flexibility than what is currently known in the art.

In this instance, and where other upper limits are not expressly stated, the reader should infer a reasonable upper limit. In this instance, for example, a commercially reasonable upper limit is about It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A comb, comprising:

a handle portion having a first side and a second side, the handle portion defining a long axis;

a plurality of regularly-spaced teeth connected to and depending from the handle portion;

first and second grooves inset into the first and second sides of the handle portion, respectively, the first and second grooves being oriented along the long axis of the handle portion generally parallel with one another; and a first level attachment including a platform having the general shape of a rectangular prism, a lower portion of the platform defining a channel open on at least a bottom side thereof to receive the handle portion of the comb, side walls of the channel defining respective left and right depending flanges with engaging portions that extend inwardly into the channel to engage the first and second grooves of the comb and to mount the platform for sliding movement along the handle portion of the comb, a level housing mounted on the platform for rotation about a generally vertical axis of rotation relative to the platform, a bubble level mounted in the level housing, a geometric shape of the level housing determining a fixed, predefined angle of the bubble level with respect to the platform, the predefined angle being greater than 0° and less than 90°, and user-manipulatable rotational actuating structure disposed in the platform and coupled to the level housing to rotate the level housing about the generally vertical axis of rotation relative to the platform; and an end level attachment including an end level housing shaped to engage and removably engaged in at least one of the first and second grooves and bearing against an end tooth of the comb, and a second level fixedly mounted in the end level housing such that it is substantially perpendicular to the long axis of the handle portion.

2. The comb of claim 1, wherein the geometric shape of the level housing comprises a generally triangular prism oriented so as to determine the predefined angle with respect to the platform.

3. The comb of claim 1, wherein the predefined angle comprises 45°.

4. The comb of claim 1, wherein the predefined angle comprises 15°.

5. The comb of claim 1, wherein the predefined angle comprises 60°.

6. The comb of claim 1, wherein the rotational actuating structure comprises a generally cylindrical dial.

7. The comb of claim 1, wherein the level housing is mounted for rotation on the platform by a shaft that engages the level housing at a first shaft end and passes through an opening in the platform to engage the rotational actuating structure.

8. The comb of claim 1, wherein the level housing has an angular range of motion of about 360°.

9. The comb of claim 1, wherein the level housing has a plurality of pre-set angular positions spaced between 0° and 360°.

10. The comb of claim 1, further comprising a second level fixedly mounted within the handle portion of the comb along the long axis.

11. A comb, comprising:
a handle portion having a first side and a second side, the handle portion defining a long axis;
a plurality of regularly-spaced teeth connected to and depending from the handle portion;
first and second grooves inset into the first and second sides of the handle portion, respectively, the first and second grooves being oriented along the long axis of the handle portion generally parallel with one another;
a first level attachment including
a platform having the general shape of a rectangular prism, a lower portion of the platform defining a channel open on at least a bottom side thereof to receive the handle portion of the comb, side walls of the channel defining respective left and right depending flanges with engaging portions that extend inwardly into the channel to engage the first and second grooves of the comb and to mount the platform for sliding movement along the handle portion of the comb,
a level housing mounted on the platform for rotation about a generally vertical axis of rotation relative to the platform,
a bubble level mounted in the level housing, a geometric shape of the level housing determining a fixed, predefined angle of the bubble level with respect to the platform, the predefined angle being greater than 0° and less than 90°, and user-manipulatable rotational actuating structure disposed in the platform and coupled to the level housing to rotate the level housing about the generally vertical axis of rotation relative to the platform;
a second level fixedly mounted within the handle portion of the comb along the long axis; and
a gyroscope mounted on the handle portion of the comb;
wherein the first level attachment, the second level, and the gyroscope allow a user to measure pitch, roll, and yaw of the comb simultaneously.

12. The comb of claim 11, wherein the geometric shape of the level housing comprises a generally triangular prism oriented so as to determine the predefined angle with respect to the platform.

13. The comb of claim 11, wherein the predefined angle comprises 45°.

14. The comb of claim 11, wherein the predefined angle comprises 15°.

15. The comb of claim 11, wherein the predefined angle comprises 60°.

16. The comb of claim 11, wherein the rotational actuating structure comprises a generally cylindrical dial.

17. The comb of claim 11, wherein the level housing is mounted for rotation on the platform by a shaft that engages the level housing at a first shaft end and passes through an opening in the platform to engage the rotational actuating structure.

18. The comb of claim 11, wherein the level housing has an angular range of motion of about 360°.

19. The comb of claim 11, wherein the level housing has a plurality of pre-set angular positions spaced between 0° and 360°.

20. The comb of claim 11, wherein the second level comprises a bubble level.

* * * * *